No. 636,464. Patented Nov. 7, 1899.
W. T. SNYDER.
FLASK FOR FORMING PERFECT CAST AND BALANCED CAR WHEELS.
(Application filed Aug. 26, 1899.)
(No Model.)
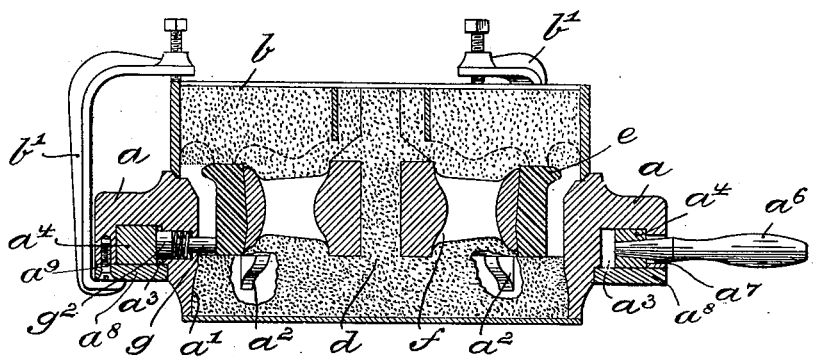
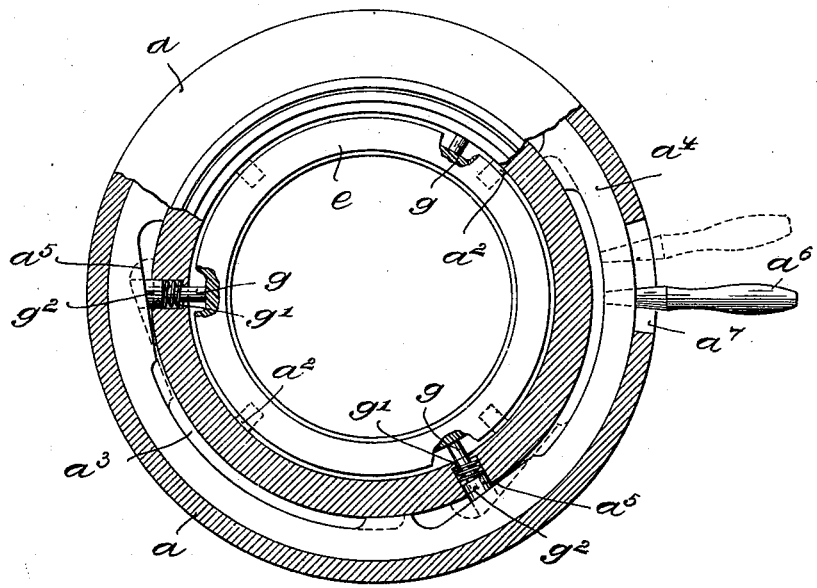
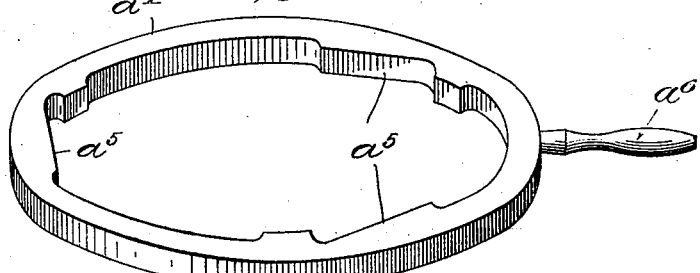
Witnesses:
Thomas M. Smith.
Richard C. Maxwell.
Inventor:
William T. Snyder,
By J. Walter Douglass
Attorney

UNITED STATES PATENT OFFICE.

WILLIAM T. SNYDER, OF CATASAUQUA, PENNSYLVANIA, ASSIGNOR OF ONE-HALF TO JAMES W. FULLER, OF SAME PLACE.

FLASK FOR FORMING PERFECT CAST AND BALANCED CAR-WHEELS.

SPECIFICATION forming part of Letters Patent No. 636,464, dated November 7, 1899.

Application filed August 26, 1899. Serial No. 728,524. (No model.)

*To all whom it may concern:*

Be it known that I, WILLIAM T. SNYDER, a citizen of the United States, residing at Catasauqua, in the county of Lehigh and State of Pennsylvania, have invented certain new and useful Improvements in Flasks for the Formation of Perfect Cast and Balanced Car-Wheels, of which the following is a specification.

My invention has relation to a flask for the formation of a perfect cast and balanced car-wheel.

In casting a car-wheel body to a steel tire a flask is used having a larger diameter than the tire. Hitherto the difficulty has been in centering the tire in the flask to receive the cast metal which is to become the body of the wheel, so as to present a uniform quantity of metal throughout to the tire to insure a perfect union of the body thereto, as well as a truly-balanced wheel. If the tire is not truly centered, an imperfect casting of the body to the tire is obtained, as well as an unbalanced wheel produced, having a tendency to pound in use. Again, through the uneven distribution of metal of the body next to the tire either no union or casting at all is obtained or a union or casting of the body to the tire of such character as to give an unsafe wheel for use. In the past to obtain a casting of a body to a tire when the tire was found to be out of center with respect to the mold was to add more metal in that portion of the body in which the required quantity of metal in the casting was deficient; but this produced a cumbersome and unbalanced wheel having a tendency in use to produce a jerking motion to the car, as well as a tendency of the wheel to pound in use.

The principal object of my invention is to overcome the disadvantageous features in the manufacture and use of a car-wheel, as hereinbefore defined, and to provide a flask with means to permit of the shifting of the heated tire mounted therein instantly into a perfectly-central position in the flask with respect to the mold to obtain a perfectly-united cast-iron body to a steel tire and, moreover, a truly-balanced car-wheel due to the even distribution throughout of the metal of the body to the tire in the casting operation, thus providing a less-expensive cast wheel than heretofore and a wheel in which tendency to pounding in use is avoided, as well as any jerking motion of the car through imperfectly-constructed wheels.

My invention, stated in general terms, consists of a flask for centering a steel tire to permit of the pouring of the metal of the body which is to become united to the tire uniformly or evenly throughout thereto, so as to produce a truly-balanced and perfectly-cast car-wheel.

The nature and scope of my invention will be more fully understood from the following description, taken in connection with the accompanying drawings, forming part hereof, in which—

Figure 1 is a cross-sectional view of a flask and mold embodying main features of my invention. Fig. 2 is a top or plan view of the flask, partly broken away and sectioned to more fully illustrate the construction and arrangement of the same and the centering mechanism; and Fig. 3 is a perspective view of the cam-ring for operating the centering-pins.

Referring to the drawings, $a$ represents the ring or wall of the flask, and $b$ the cope, which, when the flask and mold $d$ are properly prepared with the tire therein, are secured by the clamps $b'$, as illustrated in Fig. 1. The wall $a$ of the flask has on its interior periphery $a'$ a series of steps or projections $a^2$, between which and the cope $d$ the tire $e$ is placed. The interior periphery $a'$ of the flask is larger in diameter than the tire $e$ and incloses the mold $d$, of sand and other materials, in which is cast the body $f$ of the wheel. In the wall $a$ is formed an annular recess or chamber $a^3$, in which is loosely fitted a ring $a^4$, which, as illustrated in Fig. 3, has on its interior periphery three cam-surfaces $a^5$. At points in the interior periphery $a'$ opposite to where the cam-surfaces $a^5$ of the ring $a^4$ are arranged are located the spring-pins $g$, each normally retracted by the spring $g'$, so as not to project within the interior of the flask. Each pin has a beveled head $g^2$, adapted when the ring $a^4$ is turned to ride upon a cam-surface $a^5$ and to thus force the pin through the wall of the flask against the periphery of the tire $e$. The ring $a^4$ may be turned by a handle $a^6$, projecting through a slot $a^7$ in the exterior wall $a$ of the flask. The cam-ring $a^4$ is preferably supported in the recess or chamber $a^3$ by an annular base-plate $a^8$, which by means of screw-bolts $a^9$ is removably secured to the flask $a$.

In operation, the mold $d$ having been first prepared, a heated tire $e$ is lowered into the flask until it rests on the steps or projections $a^2$. The ring $a^4$ is now turned so that its cam projections $a^5$ will force the pins $g$ inwardly until they rest upon and center the tire $e$. The ring is then returned to its normal position and the pins $g$ withdrawn from contact with the tire. The cope $b$ is now clamped down upon the tire and the metal to become the body $f$ then poured or cast in the mold $d$ in any well-known manner and properly unites with the entire inner surface of the tire.

By positioning the tire in the hereinbefore-described manner the same will be brought into an absolutely central position with respect to the mold, and the metal poured to form the body of the wheel will be evenly distributed within the space to receive the same. The advantages derived therefrom are not only a wheel in which the cast-iron body is perfectly united to the steel wire, but one in which the body is truly balanced—that is, a wheel which is not heavier in one portion than in another; moreover, a wheel due to its construction which in use will not have a tendency to pound due to any uneven distribution of the metal of the body in the wheel, so that the longevity of the tire will be considerably prolonged. By shifting the tire into a perfectly central position with respect to the mold is effected a saving of body metal and preventing, aside from the saving of body metal, the formation of an abnormally heavy wheel which is adapted to increase the dead load or weight of a car.

Having thus described the nature and objects of my invention, what I claim as new, and desire to secure by Letters Patent, is—

1. In a combined flask and mold for car-wheels, a flask having on its interior periphery supports adapted to receive a tire, and means in connection with said flask for centering the tire on said supports with respect to the mold, substantially as and for the purposes described.

2. In a device of the character described, a flask having on its interior periphery a series of steps to support a tire and means in connection with the flask for centering the tire on said steps, substantially as and for the purposes described.

3. In a device of the character described, a flask, means within its interior periphery adapted to support the tire of a car-wheel, a series of pins normally retracted within the flask, and means for extending said pins beyond the interior periphery of said flask so as to abut against and center the tire within the flask, substantially as and for the purposes described.

4. In a device of the character described, a flask having a recess in its wall, a ring adapted to be turned in said recess, a series of pins located in the wall of said flask, and means connected with said ring adapted to project said pins into the interior of said flask, when said ring is turned, substantially as and for the purposes described.

5. In a device of the character described, a flask having an annular recess in its wall, a cam-ring adapted to be turned in said recess, a series of pins located in the wall of said flask and adapted to be projected into the interior of the flask, when said ring is turned in one direction and means for retracting said pins, when the ring is turned in the opposite direction, substantially as and for the purposes described.

In testimony whereof I have hereunto set my signature in the presence of two subscribing witnesses.

WILLIAM T. SNYDER.

Witnesses:
A. N. ULRICH,
EDW. D. BOYER.